United States Patent
Bourhis et al.

[11] Patent Number: 6,029,476
[45] Date of Patent: Feb. 29, 2000

[54] METHOD AND APPARATUS FOR MANUFACTURING AN OPTICAL FIBER PROVIDED WITH A HERMETIC COATING

[75] Inventors: Jean-François Bourhis, Taverny; Jean-Pierre Bloas, Conflans Ste Honorine; Patrick Mac Kenzie, Paris; Max Matau, Villeneuve la Garenne, all of France

[73] Assignee: Alcatel, Paris, France

[21] Appl. No.: 09/058,774

[22] Filed: Apr. 13, 1998

[30] Foreign Application Priority Data

Apr. 14, 1997 [FR] France .................................. 97 04542

[51] Int. Cl.⁷ .......................... C03B 37/018; C03B 5/44; C03B 37/10
[52] U.S. Cl. ............................... 65/413; 65/423; 65/431; 65/513; 65/530; 65/532; 427/166; 427/249; 118/718; 118/719; 118/420
[58] Field of Search .................. 65/413, 423, 430, 65/431, 529, 530, 532, 513; 118/718, 719, 420; 417/166, 163.2, 249, 255

[56] References Cited

U.S. PATENT DOCUMENTS

| | | |
|---|---|---|
| 5,194,080 | 3/1993 | Aikawa et al. . |
| 5,296,011 | 3/1994 | Aikawa et al. . |
| 5,320,659 | 6/1994 | Ishiguro et al. . |
| 5,346,520 | 9/1994 | Meabon et al. . |
| 5,348,564 | 9/1994 | Aikawa et al. . |
| 5,352,261 | 10/1994 | Aikawa et al. . |
| 5,637,130 | 6/1997 | Nagayama et al. . |

FOREIGN PATENT DOCUMENTS

| | | |
|---|---|---|
| 0498939A1 | 8/1992 | European Pat. Off. . |
| 0571915A1 | 12/1993 | European Pat. Off. . |
| 2-145462 | 6/1990 | Japan . |
| 2-192438 | 7/1990 | Japan . |
| 7-206476 | 8/1995 | Japan . |

*Primary Examiner*—Stanley S. Silverman
*Assistant Examiner*—Jacqueline A Ruller
*Attorney, Agent, or Firm*—Sughrue, Mion, Zinn Macpeak & Seas, PLLC

[57] ABSTRACT

A method and apparatus for manufacturing optical fibers provided with hermetic coatings, wherein the bare fiber made from a heated preform advances through a stream of reactive gaseous medium which flows at a constant speed in the direction of advance of the fiber, which is then accelerated, and which is finally removed remote from the fiber by a stream of inert gas flowing in the opposite direction from the direction of the stream of reactive gaseous medium. Application is to manufacturing optical fibers for telecommunications.

10 Claims, 1 Drawing Sheet

METHOD AND APPARATUS FOR MANUFACTURING AN OPTICAL FIBER PROVIDED WITH A HERMETIC COATING

The present invention relates to a method of manufacturing optical fibers having hermetic coatings, and to apparatus suitable for implementing such a method.

BACKGROUND OF THE INVENTION

It is known that organic gases from compositions based on carbon can be used to form hermetic coatings on optical fibers made, for example, of silica. European Patent Application EP-A-308 143 describes an optical fiber that is coated with a carbon hermetic coating as it passes through a reactor in which the fiber is put in contact with a reactive gaseous medium. That apparatus essentially comprises a cylindrical reactor placed vertically, and the fiber moves down through the reactor. A reactive gaseous medium is fed in at the bottom of the reactor, and escapes therefrom at the top thereof. Air locks are formed at the ends of the reactor to prevent any interaction between the atmosphere and the reactive gaseous medium.

It has been observed that deposits of carbon soot build up rapidly at the top and, above all, at the bottom of such an apparatus. The presence of soot in the reactor makes it possible for the soot to settle on the fiber and to degrade the properties of the already-formed hermetic coating. Therefore, the maximum length of fiber that can be obtained before the apparatus needs cleaning is only a few kilometers.

Since the cost of manufacturing optical fibers depends directly on the length of fiber that can be manufactured in a single run by being treated in such an apparatus, attempts have been made to reduce soot buildup.

Document EP-A-518 318 describes a method and apparatus for manufacturing an optical fiber having a hermetic coating. In that method and apparatus, soot is prevented from building up in the reactor by forming a continuous film of liquid on the inside wall of the reactor; as the liquid runs off, it entrains with it any soot that forms in the reactor. It is mentioned that that method and apparatus make it possible to obtain fiber in continuous lengths longer than 100 km. Unfortunately, that method is complex and difficult to implement, and forming a continuous film of liquid along the walls poses problems. The reactor flares going downwards, and it includes devices for purifying the liquid after use and the spent gases. In that reactor, the reactive gaseous medium flows at a constant speed in the same direction as the fiber, and then its speed decreases at an end-piece whose end corresponds to the reactor flare.

Document EP-A-571 915 describes other another apparatus for producing an optical fiber having a hermetic coating and that can be very long since soot build-up in the reactor is reduced. According to that document, the speed of advance of the reactive gaseous medium is reduced gradually along the fiber, in the portion in which chemical vapor deposition is performed. That document describes, in particular a comparison performed between a conventional reactor and a reactor in which the crosssectional area increases gradually, that reactor making it possible to manufacture a fiber that is twice as long as the fiber that can be manufactured with the conventional reactor.

The above-mentioned problem of soot building up in the reactor is due to the fact that a portion of the reactive gaseous medium decomposes, thereby forming soot which is deposited on the wall of the reactor. In the above-mentioned document EP-A-518 318, the result is obtained by the soot being mechanically entrained as it forms, whereas, in above-mentioned document EP-A-571 915, the result is obtained by reducing the speed of the gas stream so that the soot is kept away from the walls of the reactor, with the speed of advance being reduced.

SUMMARY OF THE INVENTION

The invention relates to another solution to the problem of soot build-up, which solution makes it possible to increase considerably the length of fiber that can be manufactured in a reactor. More precisely, in accordance with the invention, at the place where the fiber has almost finished receiving the carbon hermetic coating, the reactive gaseous medium is accelerated before it is moved away from the fiber which then penetrates directly into an inert gas. Soot build-up is reduced in the chemical vapor deposition portion because the gas stream is accelerated, and any soot is then entrained into an annular space separate from the fiber, and it therefore cannot be-deposited on the fiber.

The invention thus provides a method of manufacturing a coated optical fiber, the method being of the type comprising manufacturing a fiber from a heated glass preform, and putting the fiber in contact with a reactive gaseous medium serving to form a coating on the fiber by chemical vapor deposition, the method further comprising causing the fiber to advance through a reactive gas medium which flows at a constant speed in the direction of advance of the fiber, and over at least a portion of the path of fiber through reactive medium, and causing the fiber to advance through an inert gas flowing in the opposite direction from the direction of advance of the fiber after the coating has been deposited; according to the invention, the method further comprises accelerating the gaseous medium in the direction of advance of the fiber in the final portion of the path of the fiber through said reactive gaseous medium, and removing the reactive gaseous medium and the inert gas after the gaseous medium stream meets the inert gas stream, so as to entrain the soot that has formed, removal taking place remote from the fiber.

Preferably, accelerating the reactive gaseous medium imparts a speed to it at the fiber that is at least 50% higher than the constant speed of flow of said reactive gaseous medium flowing in the same direction as the fiber.

Preferably, the reactive gaseous medium is accelerated at a place where the surface temperature of the fiber lies in the range 1000° C. to 1050° C.

In one implementation, the reactive gaseous medium contains acetylene, and the inert gas is argon.

The invention further provides an apparatus for manufacturing an optical fiber provided with a hermetic coating, in which apparatus a glass optical fiber preform is melted in a fiber-drawing furnace to produce a bare optical fiber which passes longitudinally through a reactor through which a reactive gaseous medium is passed, and the bare optical fiber is coated with a thin carbon coating formed by the reactive gaseous medium by chemical vapor deposition. According to the invention, the reactor comprises a first portion in which a chemical vapor deposition step is performed to form a hermetic coating, a second portion of cross-sectional area smaller than that of the first portion, and a third portion provided internally with a sleeve, the sleeve being disposed longitudinally, having an open end in the vicinity of the second portion, and defining an annular space between itself and the third portion, the other end of the sleeve being connected to a device for feeding in an inert gas.

Preferably, the longitudinal distance between the end of the sleeve and the second portion is of the same order of magnitude as the radial distance between the sleeve and the third portion.

Advantageously, the second portion is provided with a gradually tapering neck designed to avoid turbulence being set up in the reactive gaseous medium stream flowing through the second portion.

Preferably, the first portion is cylindrical in shape, and it is also advantageous for the sleeve and the third portion to be cylindrical in shape.

Preferably, at each end of the reactor, the apparatus further comprises an air lock via which an inert gas can be fed in, and which serves to prevent the ambient atmosphere from entering the reactor. It is then also advantageous for the inert gas feed air lock that is placed at the fiber outlet of the reactor to constitute the device for feeding in an inert gas.

BRIEF DESCRIPTION OF THE DRAWINGS

Other characteristics and advantages of the invention appear more clearly from the following description of an embodiment given with reference to the accompanying drawing, in which.

DETAILED DESCRIPTION OF THE PREFERRED EMBODIMENTS

In a conventional method of manufacturing optical fiber, a bare fiber drawn from a preform receives a coating formed essentially of carbon by being subjected to chemical vapor deposition. The coating is hermetic, and it thus offers lasting protection to the fiber. For the coating to be hermetic, a certain number of conditions must be satisfied relating, in particular, to reaction temperatures and to the composition of the reactive gaseous medium used for the chemical vapor deposition. The decomposition operation that accompanies the chemical vapor deposition gives rise to carbon soot that tends to be deposited not only in the reactor, but also on the fiber itself. The thicker the non-hermetic deposit of soot, the more harmful it is, and it can even make the fiber unusable. Therefore, it is essential to limit the quantity of soot that can be deposited on the hermetic coating formed in the initial chemical vapor deposition step.

Figure 1:
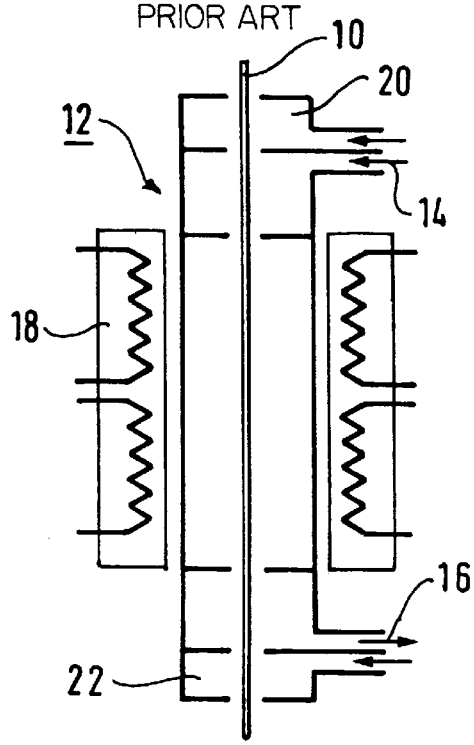
FIG. 1 shows an example of prior art apparatus in which soot builds up.

FIG. 1 shows a prior art reactor used to form such a hermetic coating. In that reactor, a fiber 10 moves down vertically through a reactor 12 that is cylindrical in shape. A reactive gaseous mixture penetrates into the reactor via an inlet 14. The reactive gaseous mixture may, for example, be constituted by ethylene and trichloromethane, and it may advantageously be constituted by acetylene, in the presence of an inert gaseous carrier. After reacting, the gaseous mixture is removed via an outlet 16 placed at the bottom of the reactor 12. Because of the flow rates used, the gas flow through the reactor is laminar.

The gaseous medium is maintained at a temperature suitable for chemical vapor deposition by a heater device 18. In addition, the external atmosphere is prevented from penetrating into the reactor by forming two air locks 20 and 22 respectively at the inlet to and at the outlet from the reactor.

Figure 2:
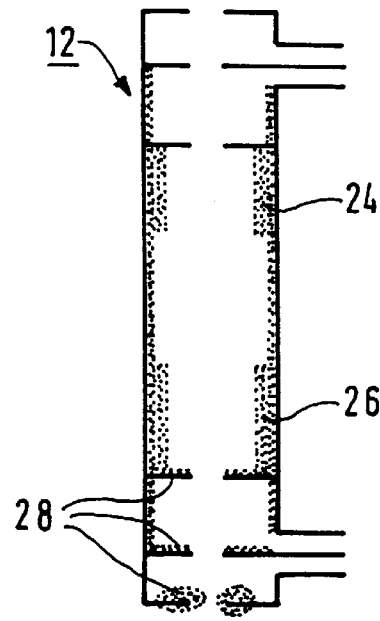
FIG. 2 shows the zones in which the soot builds up in the reactor shown in FIG. 1.

FIG. 2 is a very diagrammatic view showing the deposits of carbon soot observed in a reactor of the type shown in FIG. 1, after an optical fiber has been manufactured. A thick deposit 24 of soot can be observed at the top of the reactor, and an even thicker deposit 26 can be observed at the bottom of the reactor. Soot also tends to deposit on the transverse partitions, in particular of the air locks, as indicated by reference 28. When the build up, i.e. the thickness, of soot in the reactor becomes excessive, fiber drawing must be interrupted in order to clean or replace the reactor.

Figure 3:
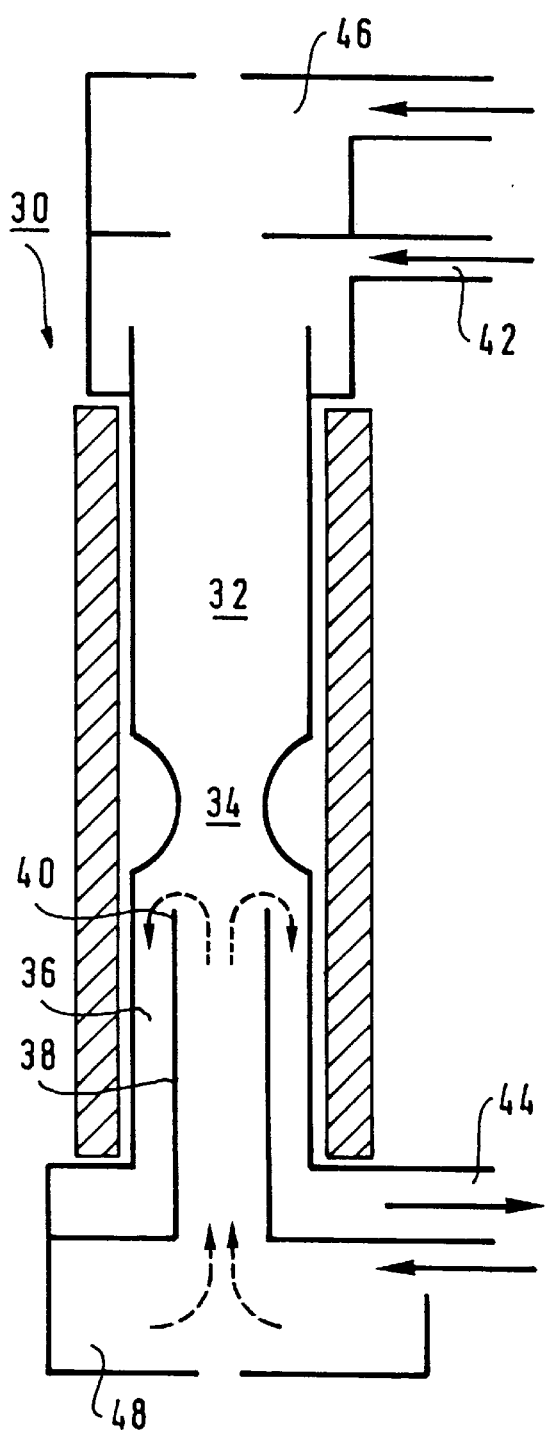
FIG. 3 is a diagrammatic section view of the apparatus of the invention.

FIG. 3 is a diagrammatic section view of the apparatus of the invention. The apparatus comprises a reactor body 30 which comprises a substantially cylindrical first portion 32, a tapered neck-forming second portion 34, and a third portion 36 which contains a central longitudinal sleeve 38 that opens out at an inner end or opening 40 in the vicinity of the neck of the second portion 34 of the reactor. As in the prior art reactor, the reactive gaseous medium is fed in via an inlet 42 placed at the top of the reactor, and it is removed with the soot at the bottom via an outlet 44. Air locks 46 and 48 protect the reactive gaseous medium against any action of the external atmosphere.

The structure of the reactor shown in FIG. 3 differs in several ways from the prior art reactor shown in FIG. 1. The most important difference is the neck of the second portion 34. It is not necessary for the second portion 34 to be very long, but it is advantageous for the neck to taper gradually so that the reactive gaseous medium that comes down from the first portion 32 is subjected to acceleration and prevents the inert gas fed in via the sleeve 38 from rising into the first portion 32. The main chemical vapor deposition reaction that forms the hermetic coating on the fiber takes place in the first portion 32. A fiber that arrives in the second portion 34 has a temperature approximately in the range 1,000° C. to 1050° C., i.e. a temperature at which soot generation becomes predominant over heterogeneous deposition on a fiber.

At this stage, the reactive gaseous medium and any soot that it contains, which soot is formed by chemical vapor deposition, are removed with the inert gas fed in via the sleeve 38, removal taking place via the annular space formed between the sleeve 38 and the wall of the third portion 36 of the reactor. The fact that soot particles can be deposited in the third portion of the reactor is of little importance because the fiber is protected by the inert gas inside the sleeve, and it is no longer in contact with the soot.

Another important characteristic of the invention is the presence of the sleeve which opens out in the vicinity of the second portion 34, i.e. its opening 40 is at a distance from the second portion 34 that is of the same order of magnitude as the distance between the sleeve 38 and the wall of the reactor in the third portion 36. This configuration is designed to create a flow regime between the neck and the open end 40 of the sleeve that is such that the inert gas fed in via the sleeve does not rise beyond the neck of the second portion 34, but does entrain the soot after it has changed direction by flowing outside the sleeve. To this end, the flow regime of the gases at the second portion 34 of the reactor and at the end 40 of the sleeve is particularly important. In order for the inert gas fed in via the sleeve 38 to be prevented from rising into the first portion 32, and in order for the reactive gaseous medium that has reacted and that contains the soot to be removed via the annular portion formed between the sleeve and the third portion 36 of the reactor, the flow rates of the reactive gaseous medium delivered via the inlet 42 and of the inert gas delivered via the sleeve must be balanced as a function of the cross-sectional areas of the neck of the second portion 34, of the sleeve 38, and of the annular space between the sleeve 38 and the third portion 36.

In an example of a reactor in which the reactor and the sleeve were circularly symmetrical about a central axis along which the fiber extended, the first portion 32 and the third portion 36 were 34 mm in inside diameter, and the second portion 34 had a smaller cross-section whose diameter was 25 mm. The sleeve 40 had a circular cross-section whose diameter was 19 mm. The end 40 was at a distance of 23 mm from the smallest-section portion of the second portion 34 of the reactor.

In this example, the reactive gaseous medium fed in via the inlet 42 was formed of a mixture of acetylene and of argon delivered at a flow rate of 0.5 liters per minute (l/m). Gaseous argon was delivered via the air lock 48 at a flow rate of 2 l/min in the sleeve 38. Thus, although the speed of the gas flowing in the opposite direction to the fiber inside the sleeve 38 was very slightly greater than the speed of the reactive gaseous medium descending through the first portion 32 in the same direction as the fiber, the neck of the second portion 34 accelerated the reactive gaseous medium which was driven by the inert gas into the annular space surrounding the sleeve 38, with a flow speed in the annular space that was six or seven times greater than in the first portion 32.

With the values indicated in the above example, it was observed that the length of fiber that could be obtained before the operation was stopped by soot building up in the reactor was about 2.5 times the length obtained in the absence of the sleeve 38, and in the absence of the neck 34.

Although some improvement could be obtained when the end 40 of the sleeve 38 was further away from the tapered second portion 34, it was observed that it was preferable for the end 40 to be close to the second portion 34, without however narrowing the gap between the reactor and the end 40 of the sleeve excessively. In the absence of the neck of the second portion 34, the sleeve 38 did not give a very significant improvement since its only effect was to reduce the working length of the reactor 30.

Naturally, the reactor of the invention also takes advantage of the improvements known in the prior art for this type of reactor, concerning, in particular, the material forming the walls of the reactor, the surface state of the material, etc. Naturally, the temperature conditions in the reactor also correspond to the best conditions known to a person skilled in the art.

Naturally, the invention is described and shown by way of preferred example only, and any technically equivalent means may be used in its component parts without going beyond the ambit of the invention.

What is claimed is:

1. A method of manufacturing a coated optical fiber from a heated glass preform, the method comprising the steps of:
    advancing the fiber in a direction along a path through a reactive gas medium which flows at a constant speed in the advancing direction of the fiber, and over at least a portion of the path of the fiber;
    coating the fiber using the reactive gas medium by chemical vapor deposition at an initial portion of the path;
    accelerating the reactive gas medium in the advancing direction of the fiber at a final portion of the path;
    advancing the fiber through an inert gas flowing in an opposite direction to the advancing direction of the fiber after the coating has been deposited, the reactive gas medium and the inert gas meeting after said reactive gas medium is accelerated at the final portion of the path; and
    removing the reactive gaseous medium and the inert gas after the gaseous medium stream meets the inert gas stream, so as to entrain any soot that has formed by the manufacturing method, removal of the reactive gas medium, the inert gas, and the soot, taking place remote from the fiber.

2. The method according to claim 1, wherein the step of accelerating said reactive gaseous medium imparts a speed to it at the fiber that is at least 50% higher than the constant speed of flow of the reactive gaseous medium flowing in the advancing direction of the fiber.

3. The method according to claim 1, wherein the reactive gaseous medium is accelerated at a place where a surface temperature of the fiber lies in the range 1000° C. to 1050° C.

4. The method according to claim 1, wherein the reactive gaseous medium contains acetylene, and the inert gas is argon.

5. An apparatus for manufacturing an optical fiber provided with a hermetic coating, in which apparatus a glass optical fiber preform is melted in a fiber-drawing furnace to produce a bare optical fiber which passes longitudinally through a reactor through which a reactive gaseous medium is passed, the reactor having two ends, one end being a fiber inlet and the other end being a fiber outlet, and the bare optical fiber is coated with a thin carbon coating formed by the reactive gaseous medium by chemical vapor deposition, wherein the reactor comprises:
    a first portion in which a chemical vapor deposition step is performed to form a hermetic coating;
    a second portion having a neck portion; and
    a third portion provided internally with a sleeve, the sleeve being disposed longitudinally, having an open end at one end in a vicinity of the second portion, and defining an annular space between itself and the third portion, an other end of the sleeve being connected to a device for feeding in an inert gas;
    wherein a cross-sectional area of the neck portion of the second portion is smaller than that of the first portion and the third portion.

6. The apparatus according to claim 5, wherein a longitudinal distance between the one end of the sleeve and the second portion is of a same order of magnitude as a radial distance between the sleeve and the third portion.

7. The apparatus according to claim 5, wherein the neck portion is gradually tapered to avoid turbulence being set up in the reactive gaseous medium stream flowing through the second portion.

8. The apparatus according to claim 5, wherein the first portion, the sleeve, and the third portion are cylindrical in shape.

9. The apparatus according to claim 5, wherein, at each end of the reactor, the apparatus further comprises an air lock via which an inert gas can be fed in, and which serves to prevent ambient atmosphere from entering the reactor.

10. The apparatus according to claim 9, wherein the inert gas feed air lock that is placed at the fiber outlet of the reactor feeds in the inert gas.

* * * * *